United States Patent
Strong, III et al.

[11] Patent Number: 6,127,787
[45] Date of Patent: Oct. 3, 2000

[54] SEQUENTIAL, CLAMPED, SINGLE-ENDED IGNITION OF SERIES OPERATION ARC LAMPS

[75] Inventors: Maurice LeRoy Strong, III, Wheeling; James Robert Guzak, Crystal Lake; Michael A. Mast, Palatine, all of Ill.

[73] Assignee: Northrop Grumman Corporation, Los Angeles, Calif.

[21] Appl. No.: 09/234,966

[22] Filed: Jan. 21, 1999

[51] Int. Cl.[7] ............................................. G05F 1/00
[52] U.S. Cl. .................. 315/294; 315/189; 315/209 CD; 315/289; 315/301
[58] Field of Search ...................... 315/294, 299, 315/289, 301, 189, 185 R, 306, 307, 241 S, 241 P, 209 CD

[56] References Cited

U.S. PATENT DOCUMENTS

| | | |
|---|---|---|
| 2,056,661 | 10/1936 | Foulka . |
| 2,918,605 | 12/1959 | Hamilton . |
| 3,315,123 | 4/1967 | Furui . |
| 3,660,716 | 5/1972 | Gorton . |
| 4,145,638 | 3/1979 | Kaneda . |
| 4,461,982 | 7/1984 | Fahnrich . |
| 4,495,446 | 1/1985 | Broen et al. ............................ 315/289 |
| 4,958,109 | 9/1990 | Naum ...................................... 315/307 |
| 5,013,977 | 5/1991 | Doroho . |
| 5,495,150 | 2/1996 | Zawislak et al. . |
| 5,861,718 | 1/1999 | Pruett ............................... 315/209 CD |

*Primary Examiner*—Don Wong
*Assistant Examiner*—Thuy Vinh Tran
*Attorney, Agent, or Firm*—Terry J. Anderson; Karl J. Hoch, Jr.

[57] ABSTRACT

A series of arc lamps is ignited sequentially while maintaining a specified voltage on one side of each lamp with dielectric insulation on the high voltage side.

20 Claims, 3 Drawing Sheets

SEQUENTIAL, CLAMPED, SINGLE-ENDED IGNITION OF SERIES OPERATION ARC LAMPS

TECHNICAL FIELD

This invention relates to igniting multiple, high energy arc lamps connected in a series configuration, and to igniting the aforementioned arc lamps sequentially, one at a time, while maintaining a known, specified maximum voltage on at least one side of each of the arc lamps during ignition, with dielectric insulation on the high voltage side, allowing miniaturization of the high voltage circuitry.

BACKGROUND ART

For certain specific applications, it is desirable to operate arc lamps, having a short arc spacing, in series because the voltage drop of such lamps is relatively low (15–18 volts). Operating multiple arc lamps individually (i.e., connected in parallel) results in inefficient high current transfer to the lamps due to increased switching loss of the associated power train circuitry associated with modulating the lamps in a high current mode. By connecting the arc lamps in series, a low voltage is presented across the power train circuitry, thus reducing the V•I losses and the I²R losses associated with power train circuits. Improved efficiency is of utmost importance when modulating arc lamps at high power levels (e.g., 400 amps peak and duty cycles approaching 50 percent).

Operating arc lamps in a series configuration, however, can present a prohibitive condition during ignition of the arc lamps when a number of arc lamps are connected in series. The ignition voltage for typical arc lamps is on the order of 11,000 volts. Thus, in order to ignite a series string of arc lamps, voltages of 22,000 volts for two series lamps, 33,000 volts for three series lamps, etc., would be required. In applications common to certain high altitude airborne infrared tracking jammers, voltages greater than 2,300 volts at altitude have proved to be prohibitive due to the necessary voltage standoff distances required in order for ambient air to prevent arcing to the structure of the jamming system. Series ignition of multiple lamps requiring 22,000 volts, 33,000 volts, etc., is prohibitively expensive due to the extensive dielectric insulation required within the mechanical assembly of the airborne structure.

The basic circuit structure of this invention includes modifications and improvements on the co-owned circuit disclosed in U.S. Pat. No. 5,495,150 to Zawislak et al., Feb. 27, 1996. The disclosure of which is hereby incorporated by reference. Among the differences and distinctions to be noted, Zawislak did not employ voltage clamping devices, anode dielectrics, nor multiple lamp state measurement for individual control of the intermediate simmer current regulators.

DISCLOSURE OF INVENTION

Objects of this invention include provision of:

Series connected arc lamps which are easily ignited using relatively low voltage, A topology that is independent of time constant control of the ignition circuitry for ignition of series connected lamps, A means for measuring the state of the lamps, (e.g. on and conducting, or off and in need of ignition), A method for clamping one end of the arc lamp, the transmitting end, to a low voltage level to avoid arcing outside the arc lamp to any surrounding structure, and A means of encapsulating the high voltage end of the arc lamp to further avoid arcing outside the arc lamp to any surrounding structure.

In the present invention, a number of arc lamps are connected in series and ignited from a single high voltage power supply by means of discharging a charged capacitor through a spark gap, and after the plasma arcs of the arc lamps are stabilized, they are modulated (ionized) with very high current in series to cause high energy illumination.

In accordance further with the invention, as each arc lamp is ignited, a regulated low level current is sustained in each arc lamp awaiting the high current ionization (illumination) of the arc lamps in use by means of a high current modulator which provides pulsed, high current ionization to the whole series of arc lamps together.

In the present invention, successive successful ignition of the individual arc lamps is accomplished by the actual mechanical and electrical configuration of the lamps. The first arc lamp in the series string (the lamp closest to the lamp power supply in the circuit) must be ignited first in order for voltage to be impressed across the second arc lamp in the series string. The second arc lamp must be ignited prior to voltage being impressed across the third lamp in the string, and so on. By relying on the mechanical and electrical configuration of the lamp for sequential ignition, faster time constants for ignition can be chosen (e.g., if a lamp extinguishes, the time constant to re-ignition is not artificially long, awaiting sequencing of all previous arc lamps in the series string).

According to the present invention, after successful ignition of each arc lamp, each arc lamp is maintained in the ignited condition by a simmer current regulator while the other arc lamps are being ignited. As each individual arc lamp is ignited, the arc is maintained in the individual lamp by its corresponding simmer current regulator until the next sequential lamp in the series string is ignited. After the next lamp is ignited, the simmer current regulator corresponding to this newly ignited lamp starts to maintain the simmer current through the newly ignited arc lamp, and all previously ignited arc lamps preceding the newly ignited arc lamp in the series string, and the simmer current regulator corresponding to the previous arc lamp(s) in the series is(are) turned off.

This approach reduces overall power dissipation in the circuitry. Only the necessary minimal arc current is maintained in the series lamps for simmer, under the control of a single simmer current regulator, thus there are no power dissipation issues in the event of long term failure to ignite sequences in the series lamps. The state of each lamp (e.g. on and conducting, or off and in need of ignition) is measured by a sense circuit which compares the voltage drop across each arc lamp to a reference voltage to determine whether the lamp differential voltage level defines the lamp state as a "lamp on" or a "lamp off" condition. The present condition determined for each lamp is used to control the sequence of the simmer current regulators, and also to disable the ignition power supply once all of the arc lamps in the series string have been successfully ignited.

In accordance with the invention, the high voltage used to ignite each of the lamps is applied differentially across each of the lamps. The cathode, or energy emitting end of the lamp, is clamped to a low voltage level, by an MOV or other appropriate voltage clamping device, forcing all the high voltage to the anode end of each of the lamps. The high voltage is then held off by use of a saturating inductor that is designed to hold off the high voltage ignition pulse for the requisite volts seconds to initiate the arc in the arc lamp. The high voltage ignition pulse is thus trapped at the anode/saturable inductor node only, and by containing this single node in an appropriate dielectric, very dense and small mechanical clearances can be used for the dielectric surrounding the arc lamps. This approach allows for considerable reduction in size for high altitude airborne infrared jammers. The saturable inductors are designed in a way that allows them to hold off the high voltage pulse during ignition, forcing the arc into the arc lamp, while saturating at simmer levels of current, thereby becoming transparent to the high current modulation circuitry used to illuminate the lamps.

This invention allows ignition of series connected arc lamps utilizing only the voltage necessary to ignite a single arc lamp, clamping one end of each of the series lamps to a known low voltage and trapping the high voltage end within an appropriate dielectric to allow miniaturization of the mechanical assemblies of a high altitude airborne infrared tracking jammer.

Further objects and advantages of this invention will become apparent from a consideration of the drawings and ensuing description of them.

BEST MODE FOR CARRYING OUT THE INVENTION

Figure 1:
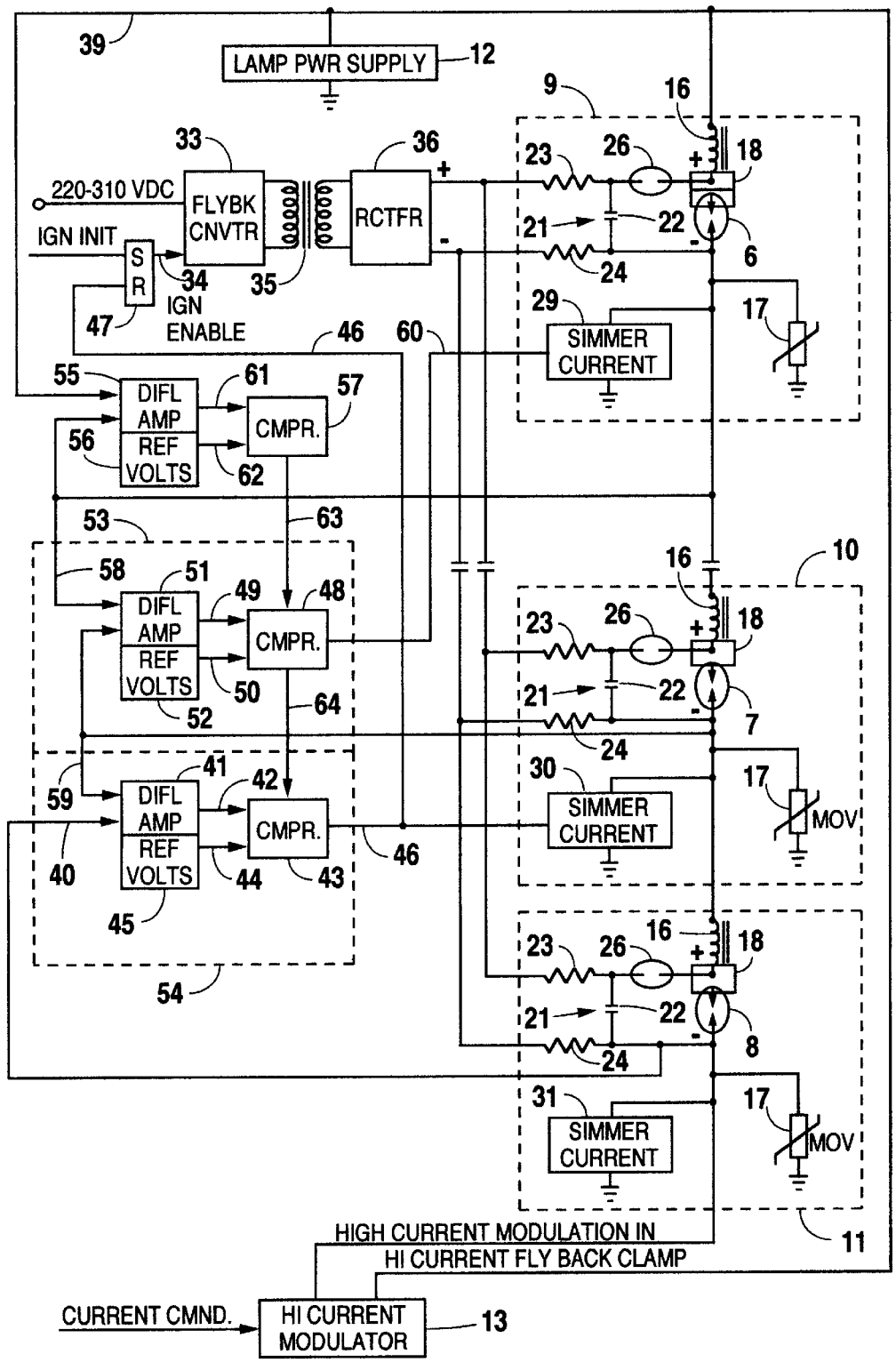
FIG. 1 is a simplified schematic block diagram depicting the circuit for sequential, single-ended arc lamp ignition, sensing the state of each arc lamp, maintaining the arc current through the arc lamps, and for high current illumination. The example circuit shown here depicts only three arc lamps in the series string for simplification of the example.

Referring to FIG. 1, a plurality of arc lamps 6–8 (3 lamps are depicted in this example), each associated with its corresponding ignition circuitry 9–11, are connected such that the arc lamps are in series between a lamp power supply 12 and a high current modulator 13.

Each of the ignition circuits 9–11 is identical to the others. Between the lamp power supply 12 and the high current modulator 13, each arc lamp 6–8 is connected to an inductor 16 at its anode (+) terminal and a voltage clamping device 17 (e.g., an MOV, metal oxide varistor, or other appropriate device) and a simmer current regulator 29–31 at its cathode or (−) terminal. A charge network 21 is connected across each of the arc lamps 6–8. Each charge network includes a charge capacitor 22 connected through a pair of high-resistance resistors 23,24 (with possible resistance values in the order of 3 mega-ohms) across the output of a high DC voltage ignition power supply 25.

The arc lamp ignition power supply 25 may be formed by means of a flyback converter 33 which may be powered, for instance, by a 220–310 volt DC, preferably +225 volt DC, regulated input. When enabled by an ignition enable signal on a line 34, the flyback converter 33 applies AC current to the primary of a step up transformer 35, the secondary of which provides very high AC voltage to a rectifier 36 which produces the ignition voltage on the order of 11,000 volts in this example.

During the ignition process, the ignition power supply 25 will apply the 11,000 volts across the charge networks 21. When each charge capacitor 22 reaches a charge of nearly that amount, a spark gap 26 in each of the charge networks allows the related capacitor 22 to discharge through the associated arc lamp 6–8.

In the present topology, no sequencing of the ignition circuitry via control of the RC charging time constants of the charge networks 21 is necessary, for the circuit topology provides inherent sequencing of successful (maintained) ignition, that is, the first arc lamp 6 in the series string must ignite, and remain ignited, in order to provide a sustaining voltage to the second arc lamp 7 in the string for successful ignition, which in turn must ignite, and remain ignited, in order to supply a sustaining voltage to the third arc lamp 8 in the string for successful ignition. Since independent operation is possible, an independent and faster charge time constant may be designed for allowing a faster re-ignition of the subsequent lamps should any of the lamps extinguish. Once each of the arc lamps 6–8 successfully ignites, a minimal arc (simmer) current is maintained through said arc lamp by a corresponding simmer current regulator 29–31 connected to the cathode terminal of each arc lamp 6–8, until the next sequential arc lamp in the series string is ignited.

Once the simmer current regulator 30,31 of a subsequent lamp 7,8 in the series string is established, this simmer current regulator can control the simmer current through all of the preceding arc lamps 6,7 in the series string. The simmer current regulator 29,30 corresponding to each of the preceding arc lamps 6,7 in the series string is no longer necessary to that preceding lamp in the series string. To increase efficiency, the preceding simmer current regulators 29,30 are turned off (i.e., when the second arc lamp 7 in the series ignites successfully and is captured into simmer mode by its corresponding simmer current regulator 30, the sense circuit 53 senses that the second lamp 7 is ignited and in simmer, and terminates the simmer current regulator 29 for the first arc lamp 6 in the series). This sequence of turning on subsequent simmer current regulators 30,31 along with successful ignition of corresponding arc lamps 7,8, and then turning off all preceding simmer current regulators 29,30, continues through the entire ignition sequence until only the final simmer current regulator 31 in the series string is on and controlling the simmer current through all of the arc lamps 6–8 in the series string.

After successful ignition of each of the arc lamps 6–8, the corresponding charge network 21 will continue to recharge and subsequently discharge through the aforementioned arc lamp, though once simmer current is established, these ignition pulses will be of no consequence to that lamp, with the exception of possible transient voltages remaining across the arc lamp. This recharge/discharge cycle of ignition pulses will continue until all of the arc lamps 6–8 in the series string are successfully ignited and the simmer current is controlled by the last simmer current regulator in the series string, at which time the 11,000 volt ignition voltage will be disabled and removed from across the charge networks 21.

Protection of the simmer current regulators and avoidance of high voltage arcs to any of the surrounding structure of the arc lamps 6–8 is accomplished by suitable voltage clamping devices 17 (e.g., MOVs or transorbs). The voltage clamping devices 17 act to clamp each of the arc lamp transmitting ends (i.e., cathodes) to a known voltage greater than the lamp power supply voltage 39 (the lamp power supply could, for example, be 225 volts), but lower than the rated voltage of the simmer current regulator circuitry 29–31 and the voltage spacing requirements from the arc lamp cathodes to any surrounding structures (this clamping voltage level could be, for instance, 450–1,000 volts). The voltage clamping devices are necessary because during ignition of arc lamps 6–8, the ignition pulses are not terminated until the final arc lamp 8 is ignited. Prior to the last arc lamp 8 in the series string being ignited, the preceding simmer current regulators 29,30 are no longer a virtual ground and therefore would not inhibit any high voltage transients from the corresponding ignition circuits 9,10 from appearing on the cathode terminal lines 58,59 of the previous arc lamps. This would result in catastrophic failure of the circuitry on these lines 58,59. Prevention of this event is provided by the voltage clamps 17.

Single-ended ignition, that is, with the voltage of the anode of each of the arc lamps 6–8 maintained at a positive voltage with respect to its cathode, and the cathode of each of the arc lamps 6–8 maintained at a specified maximum voltage, is guaranteed by using the voltage clamping device 17 (e.g., an MOV). The voltage clamping device 17 clamps the cathode of the arc lamp 6–8 to a preselected value, low enough to avoid any arcing to the surrounding structure, and forces the anode to fly up to 11,000 volts above the clamping device voltage.

AC isolation between the series ignition circuits 9–11 is provided by the reactors 16 connected to each anode of its respective arc lamp 6–8. The reactors 16 are designed using a square loop material for the core and are thus designed to hold off the necessary volts seconds product of the high voltage pulse necessary to ignite the arc lamps 6–8, and then to saturate in order to present a low inductance for the system.

Figure 2:
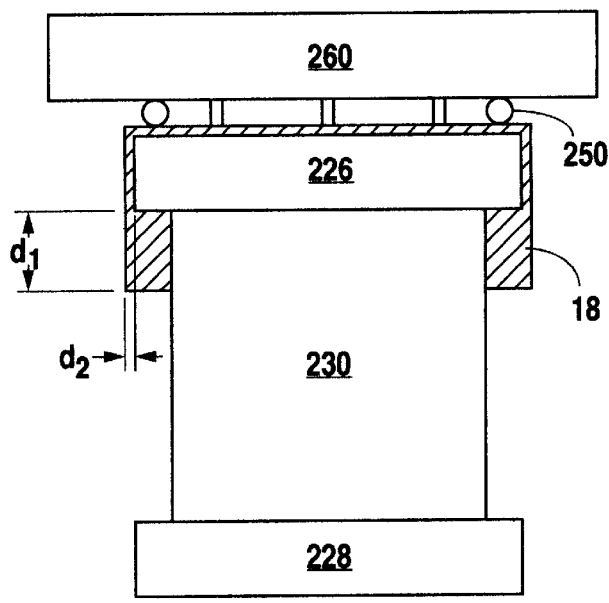
FIG. 2 shows the high voltage insulation technique which allows miniaturization of the arc lamp mechanical assemblies.

High voltage isolation of the anode of each of the arc lamps 6–8 with respect to its cathode and other surrounding non-insulating surfaces (metal framework at ground, etc.) is made possible by attaching a dielectric 18 to each lamp's anode and insulating body as shown in FIG. 2. This dielectric 18 must have insulating capability at high temperature (approximately 150 degrees Centigrade) and must bond to surfaces with sufficient strength to maintain insulation through temperature cycling. The dielectric insulation can either be an elastomeric material which conforms with dimensional changes during temperature excursions or a dielectric insulating material which closely matches the coefficient of temperature expansions of the lamp's anode 226 material and body material. The dimension d1 must be adequate to prevent high voltage breakdown along the interface between the dielectric and lamp's body 230. This is typically 0.44 inches for 11,000 volts (25 volts/mil). The dimension d2 must be adequate to prevent arcing through the dielectric. This is an electrical stress level typically 20% of the short term breakdown electrical stress level. In the representative sample shown, the high voltage interconnections to the top of the lamp anode 226 are also insulated using a glued or pressure sealing assembly 260 of high voltage feed throughs and pressure sealing (e.g., o-ring) cover 250. The high voltage wire connections are shown only for thoroughness and are not considered part of the invention.

Measuring the state of each of the arc lamps 6–8 (whether the lamp is on and conducting, or off and in need of ignition), which is necessary for the appropriate sequencing of the corresponding simmer current regulators 29–31, is accomplished by the sense circuit(s) 53–54 which sense the suitable reduction in voltage drop across each lamp 6–8 after successful ignition. Prior to ignition of any of the arc lamps 6–8, each corresponding simmer current regulator 29–31 is a virtual ground, therefore the full lamp power supply voltage, on line 39, initially appears across the first arc lamp 6 in the series string. A line 39 connected to the output of the lamp power supply 12 and a line 58 connected to the cathode terminal of the first arc lamp 6 in the series are applied to a differential amplifier 55, the output of which is the voltage differential (39 minus 58) across the first lamp 6 in the series. This differential voltage is applied through a line 61 to a comparator 57 where it is compared to a reference voltage 62 generated from a source of reference voltage 56. This reference voltage 56 is set as a voltage level such that a lamp differential voltage greater than this reference level would be defined as an arc lamp in the "off and in need of ignition" state, and a lamp differential voltage less than this reference level would be defined as an arc lamp in the "on and conducting" state (e.g., <45 volts). When the differential lamp voltage (39 minus 58) across the first arc lamp 6 in the series, indicated on line 61, is greater than the reference voltage on line 62, and thus in a state defined as a lamp "off" condition, the comparator 57 sends a command 63 to a second comparator 48 to maintain the enable, through a line 60, to the first simmer current regulator 29 in the series string. This condition is defined as "arc lamp 6 off and in need of ignition". In this condition, the first simmer current regulator 29 acts as a virtual ground awaiting the ignition pulse and ignition voltage from the ignition charge network 21. Upon ignition, the arc lamp 6 goes into conduction and simmer, and the voltage drops to approximately 15 volts differentially across the lamp 6. The differential amplifier 55 senses the differential voltage drop and sends the reduced voltage signal, through line 61, to the comparator 57. The comparator 57 compares the new, lower voltage drop to the reference voltage 56, and since the lamp differential voltage level is now less than the reference voltage level 62, (e.g., <45 volts) indicating a lamp "on" condition, the comparator 57 now generates an "arc lamp 6 on" command 63. This command now enables the next comparator 48 to begin comparing the differential voltage across the next arc lamp 7 in the series string, from a line 58 connected to the cathode terminal of the previous arc lamp 6 and a line 59 connected to the cathode terminal of the arc lamp 7 which is now being measured, to identify whether this next arc lamp 7 has successfully ignited and is in simmer mode, or extinguished and in need of ignition.

If the previous arc lamp 6 is in simmer and the presently measured arc lamp 7 is extinguished, the voltage across this second arc lamp 7 will be the lamp power supply voltage on line 39 minus the first arc lamp 6 voltage (though for a re-ignition condition, this level could be as high as the clamped voltage level, set by the voltage clamping device 17 connected to the cathode terminal of the first arc lamp 6, due to the transient voltages from the continued ignition cycling described earlier). This differential voltage across the second lamp 7 in the series, at a level output by the differential amplifier 51 through a line 49, is compared via a comparator 48 to a reference voltage 52 applied through a line 50. When the lamp differential voltage across the second arc lamp 7 in the series is greater than a predetermined voltage (e.g., 45 volts), the comparator 48 generates an "arc lamp 7 off" command which enables the first simmer current regulator 29 to maintain the first arc lamp 6 in simmer, and forces the next comparator 43 to maintain the enable to the second simmer current regulator 30, corresponding to the second arc lamp 7, until the ignition sequence across the arc lamp 7 is successful. When the ignition sequence across the second arc lamp 7 is complete and successful, and in simmer mode via the corresponding simmer current regulator 30, the arc lamp voltage drops to the voltage of a conducting arc lamp in simmer (e.g., 15 volts), and the corresponding differential amplifier 51 passes this reduced voltage drop, through line 49, to the comparator 48, which when comparing it to the reference voltage on line 50, senses the drop in voltage and generates an "arc lamp 7 on" command 60. This "arc lamp 7 on" command 60 disables or turns off the simmer current regulator 29 associated with the first arc lamp 6 in the series (because the simmer current for both of the first two arc lamps 6,7 can now be maintained by the second simmer current regulator 30), and enables the third comparator 43 to begin monitoring the on/off state of the next arc lamp 8 in the series.

The same sequence, as described for the second arc lamp 7, is repeated for the final arc lamp 8 in this example, or for any additional arc lamps which could be included in the series string. Any additional lamps added into the circuit between the first arc lamp 6 and the final arc lamp 8 in the series string would have a corresponding sense circuit 53. The last arc lamp 8 in the series has a slightly different sense circuit 54. In this example, the ignition sequence is repeated with a line 59 connected to the cathode of the previous arc lamp 7 and a line 40 connected to the cathode of the final arc lamp 8, both applied to the last corresponding differential amplifier 41, the output of which is applied through a line 42, along with a reference voltage 45 through a line 44, to the last comparator 43, which generates an "arc lamp 8 on" command. This signal on line 46 is used to terminate the operation of the previous simmer current regulator 30, because the last simmer current regulator 31 in the series string can now maintain the simmer current in all of the previously ignited, preceding arc lamps 6–8, and will maintain this simmer current before, during, and after high current modulation to cause illumination. The signal on the line 46 is also used to send a signal to a logic circuit, represented herein by a simple bistable device 47, to remove the ignition enable signal 34, disabling the high voltage ignition power supply 25, and thus terminating the ignition pulses to the arc lamps 6–8.

If one of the lamps extinguishes prematurely, the current to each subsequent arc lamp in the series string will be disconnected, and all of the subsequent arc lamps will also extinguish. The differential amplifiers 55,51,41 will sense the changes in the voltage differentials and send the control signal to the ignitor, indicating "arc lamps extinguished and ready for re-ignition". This signal can be utilized to automatically initiate the ignition sequence in the event of an arc lamp being extinguished.

Miniaturization of the arc lamp assemblies, with mechanical spacings from high voltage (anode) to low voltage (cathode and the surrounding grounded structures) less than that required when using ambient air as the dielectric, is made possible using the high voltage dielectric insulation 18 previously discussed, and detailed in FIG. 2. The high voltage insulation chosen with the previously specified criteria will electrically insulate the lamp(s) through severe environmental conditions of temperature and altitude.

Figure 3:
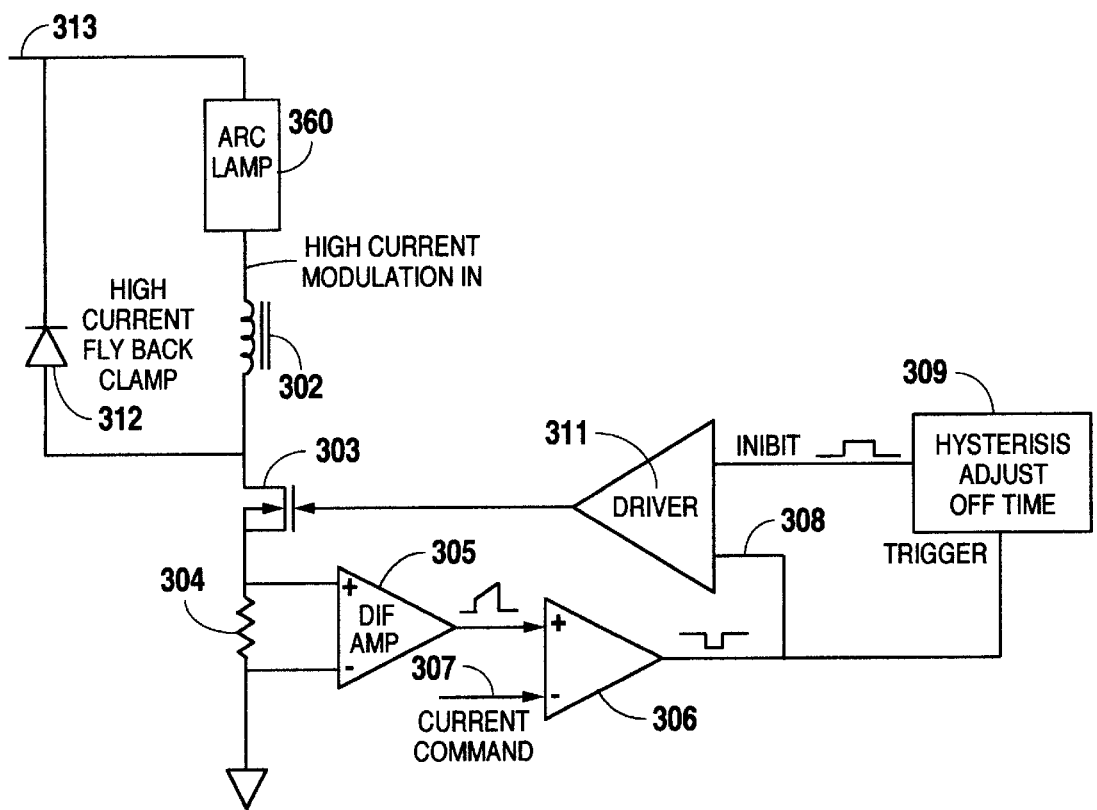
FIG. 3 is a simplified schematic block diagram of the high current modulator.
Figure 4:
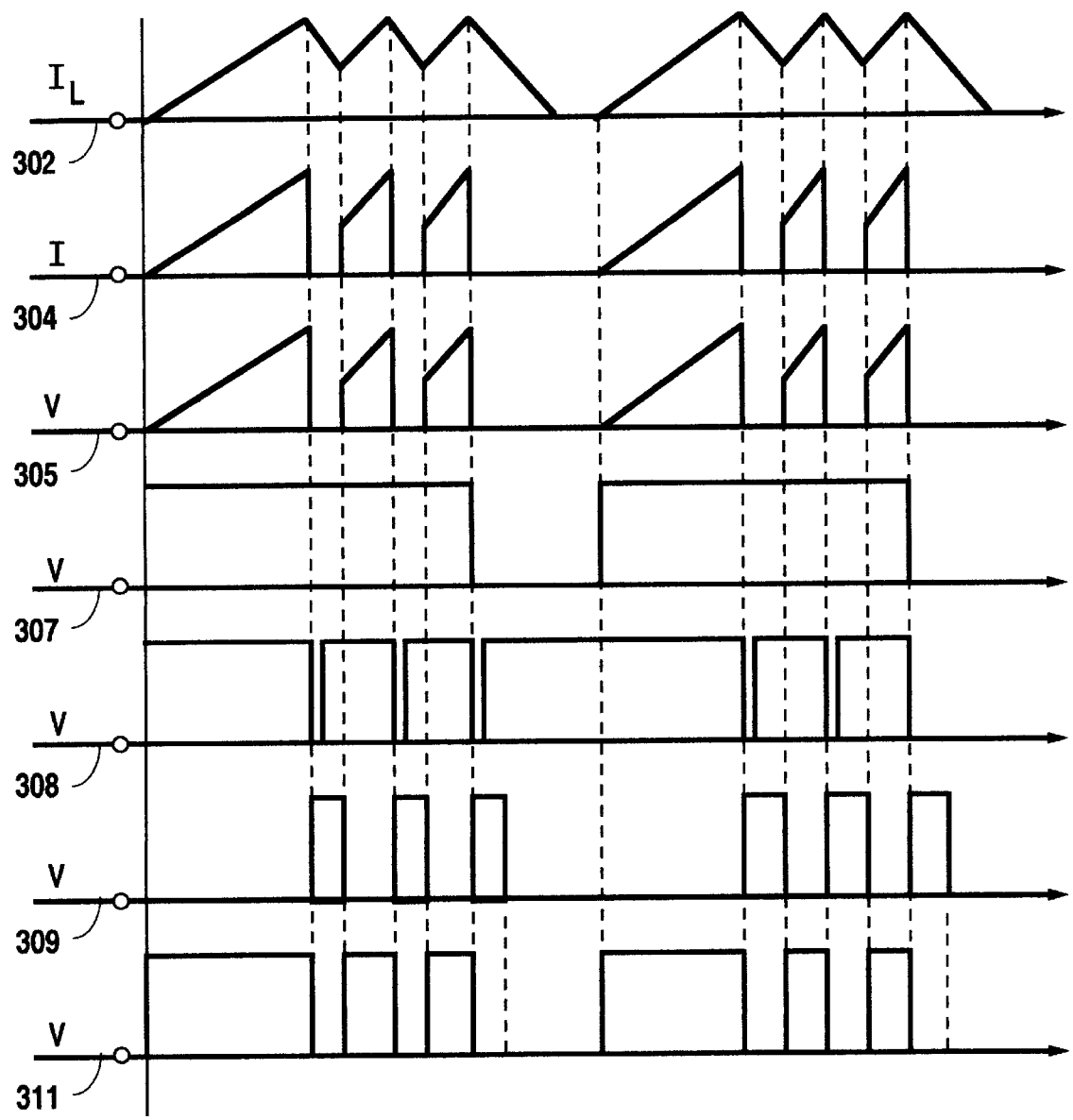
FIG. 4 shows the waveform timing relationship of elements of FIG. 3.

The high current modulator 13 is further expanded in FIG. 3. Waveform timing relationships are shown in FIG. 4. The high current modulator consists of an inductor 302, a high current switch 303, a current sense shunt 304, a differential amplifier 305, a comparator 306, a monostable vibrator 309 to set a fixed off time interval for the high current switch 303, and a driver 311 to drive the high current switch 303. The circuit operates as follows: A current command (e.g., 400 amps) is input to the comparator 306 turning on the driver 311. The driver 311 turns on the high current switch 303 causing the current through the inductor 302 to ramp up. As the current through the inductor 302 ramps up, the voltage across the current sense shunt 304 ramps up and is amplified by the differential amplifier 305 and compared to the current command. When the sensed current across the current shunt 304 exceeds the current command (e.g., 400 amps), the command 308 to the driver from the comparator 306 terminates the drive to the high current driver 311. The negative going edge of the command 308 from the comparator 306 also triggers a monostable vibrator 309 which counts a fixed time (e.g., 20 microseconds) disabling any drive from the driver 311 to the high current switch 303. The effect is to introduce a fixed off time into the switch control circuit and thus a hysteresis into the current decay through the inductor 302. When the switch 303 is turned off, the circulating current through the inductor 302 is returned through the diode 312 to the output capacitors in the lamp power supply 12. This topology results in increased efficiency in providing high energy modulation to the lamps 360.

In summary, successful ignition of the arc lamps 6–8, and the appropriate corresponding sequencing of the simmer current regulator 29–31, is accomplished by sensing the reduction in voltage drop across the lamp after successful ignition. Prior to ignition of any of the arc lamps 6–8, the simmer regulator is a virtual ground, therefore the full power supply voltage 39 appears across lamp 6. The differential amplifier 55 divides down the differential voltage (39 minus 58) across lamp 6 and sends the conditioned voltage to a comparator 57 where it is compared to a referenced voltage 62 (generated from a voltage reference 56). When the differential lamp voltage 39 minus 58 is greater than the state defined as a lamp on (e.g., <45V), the comparator 57 sends a command 63 to the comparator 48 forcing the comparator 48 to maintain the enable to the top simmer regulator 29. This condition is defined as the arc lamp 6 off and in need of ignition. In this condition, the simmer current regulator 29 acts as a virtual ground awaiting the ignition pulse from the ignition power supply and ignition voltage. Upon ignition, the arc lamp 6 goes into conduction and simmer and the voltage drops to approximately 15V differentially across the lamp. The differential amplifier 55 senses the drop and sends the signal to the comparator 57. Comparator 57 compares the voltage drop to the reference voltage 62 and generates an arc lamp 6 on command 63. This command now enables the comparator 48 to begin comparing the differential voltage 58 minus 59 across arc lamp 7 to identify whether arc lamp 7 is in simmer mode or extinguished and in need of ignition. If arc lamp 6 is in simmer and arc lamp 7 is extinguished, the voltage across arc lamp 7 will be the lamp power supply voltage 39 minus the arc lamp 6 voltage (i.e., lamp power supply voltage minus arc lamp 6 voltage). This differential voltage across lamp 7,58 minus 59, is divided down by the differential amplifier 51 and compared by comparator 48 to a reference voltage 50. When the voltage 58 minus 59 is greater than a predetermined voltage (e.g., 45V), comparator 48 generates an arc lamp 7 off command which enables the simmer regulator 29 to maintain arc lamp 6 in simmer and forces the comparator 43 to maintain the enable to simmer regulator 30 (via signal 64) until the ignition sequence across arc lamp 7 is successful. When the ignition sequence across arc lamp 7 is complete and successful, the arc lamp voltage drops from the lamp power supply voltage 39 minus arc lamp 6 voltage to the voltage of a conducting arc lamp in simmer (e.g., 15V), the differential amplifier 51 passes this voltage drop across arc lamp 7 to the comparator 48, which when comparing it to the reference voltage 50, senses the drop in voltage and generates an arc lamp 7 on command 60. This arc lamp 7 on command disables or turns off the simmer current regulator 29, for the simmer current for arc lamps 6 and 7 can now be maintained by simmer current regulator 30. Comparator 48 also generates an enable command 64 which enables comparator 43 to begin monitoring the on/off state of arc lamp 8. The same sequence, as described for arc lamp 7, is repeated by the differential amplifier 41, reference voltage 44, and comparator 43, which generates an arc lamp 8 on command 46. The arc lamp 8 on command 46 is used to terminate the operation of simmer current regulator 30 because the simmer current regulator 31 can now maintain the simmer current in arc lamps 6–8 and also to terminate the ignition pulses generated by the high voltage power supply 25. This command is accomplished via a set/reset command signal 47 which generates the ignition enable command 34. Protection of the simmer current regulators and avoidance of high voltage arcs to any of the surrounding structure of the arc lamps 6–8 is accomplished by suitable voltage clamping devices 17 (e.g., MOVs or transorbs). The voltage clamping devices 17 act to clamp the arc lamp transmitting ends (i.e., cathode) to a known voltage greater than the lamp power supply voltage 39, but lower than the rated voltage of the simmer current regulator circuitry 29–31 and the voltage spacing requirements from the arc lamp cathodes to any surrounding structures. The voltage clamping devices are necessary because during ignition of arc lamps 6–8, the ignition pulses are not terminated until the final arc lamp 8 is ignited. Prior to the arc lamp 8 being ignited, the simmer current regulator currents 29 and 30 are no longer a virtual ground and therefore would not inhibit any high voltage transients from the ignition circuits 9 and 10 from appearing on the voltage lines 58 and 59. This would result in catastrophic failure of the circuitry on lines 58 and 59. Prevention of this event is provided by the voltage clamps 17.

A typical scenario for this circuit is then as follows: a mission begins with application of a signal to the set (S) side of the bistable device 47 (or other equivalent logic circuitry) which initiates the ignition process previously described. Then, there may be no further activity with respect to the arc lamps 6–8 for some time, such as throughout an entire airborne mission. However, after ignition of the arc lamps 6–8, when high energy illumination of the arc lamps is required, a current command is sent to the high current modulator 13. The high current modulator 13 has previously been described above. After completion of the jamming sequence, the current command is removed from the high current modulator 13 and the arc lamps 6–8 return to a low current simmer mode. At the completion of a mission, the arc lamps 6–8 are then extinguished.

Although this invention has been shown and described with respect to exemplary embodiments thereof, it should be understood by those skilled in the art that the foregoing and various other changes, omissions, and additions may be made therein and thereto, without departing from the spirit and scope of the invention.

We claim:

1. A system for igniting and illuminating a plurality of arc lamps connected in series, comprising:
    a plurality of arc lamps;
    a DC voltage lamp power supply providing a voltage at its output suitable for driving a series connection of said lamps sufficiently for illumination thereof following ignition;
    a high current modulator for controlling high current pulses through the series connected arc lamps, said arc lamps being connected in series with each other between said power supply and said current modulator;
    a high DC voltage ignition power supply providing at a pair of terminals a voltage suitable for initial ignition of one of said arc lamps;
    a plurality of RC charge networks, one for each of said arc lamps, each having a capacitor, each plate of each capacitor connected through a resistor to a respective terminal of said ignition power supply, each capacitor connected through a spark gap across corresponding one of said arc lamps;
    a plurality of simmer current regulators, each of said arc lamps associated with one of said simmer current regulators; and
    a plurality of sense circuits, each of the sense circuits in electrical communication with a respective simmer current regulator and operative to control the ignition sequencing of the series connected lamps independent of a time constant control of the RC charge networks.

2. The system of claim 1 wherein the improvement comprises means for measuring the on-off state of the lamps for individual control of the intermediate simmer current regulators.

3. The system of claim 1 wherein the improvement comprises means for clamping the transmitting end of the arc lamp to a low voltage level to avoid arcing outside the arc lamp.

4. The system of claim 1 wherein the improvement comprises means for insulating the high voltage end of the arc lamps to avoid arcing outside the arc lamp.

5. The system of claim 1 wherein the improvement comprises means for the successive, successful ignition of the individual arc lamps wherein the first arc lamp in the series string must be ignited first in order for voltage to be impressed across the second arc lamp in the series string, where the first lamp is the lamp closest to the lamp power supply in the circuit, and the second arc lamp must be ignited prior to voltage being impressed across the third lamp in the string, and so on to the nth and last lamp in the series.

6. The system of claim 1 wherein the improvement comprises means for clamping the cathode or energy emitting end of the lamp to a low voltage level by a voltage clamping device during high voltage ignition and means for trapping the high voltage end within an appropriate dielectric.

7. The system of claim 1 wherein the improvement comprises means for igniting a series configuration of multiple arc lamps with a single high voltage ignition circuit.

8. The system of claim 1 wherein the improvement comprises means for using a dielectric material on the nontransmitting end of the series arc lamps to enable lamps not designed with adequate voltage spacings at altitude to be used at high altitude.

9. The system of claim 1 wherein the improvement comprises means for using dielectric materials to enable miniaturization of structures surrounding the arc lamps by minimizing voltage spacings required for performance at high altitude.

10. The system of claim 1 wherein the improvement comprises means for series ignition to enable independent, series ignition of the series arc lamps for fast reignition of an extinguished arc lamp.

11. The system of claim 1 wherein the improvement comprises hysteretic control circuit means for high current modulation of arc lamps in a series configuration.

12. A method of igniting and illuminating a series of arc lamps, comprising:

connecting each of said arc lamps through a corresponding coil, in series with all other ones of said arc lamps and their corresponding coils, in a string between a lamp power supply, having a DC voltage suitable for driving the series connection of said arc lamps sufficiently for illumination thereof after ignition, and a high current modulator, for controlling high current pulses through said arc lamps to illuminate them;

connecting each of said arc lamps to a corresponding sense circuit;

discharging a high DC ignition voltage through a spark gap across each lamp separately to ignite an arc therein;

controlling the sequencing of the high DC ignition voltage in the series connected arc lamps with a corresponding sense circuit such that the sequencing of the series connected lamps is independent of a time constant control of ignition circuitry of each lamp;

maintaining a low, arc sustaining simmer current in each arc lamp after ignition thereof; and thereafter, providing high current pulses through said arc lamps to cause them to illuminate.

13. The method of claim 12 wherein the improvement comprises measuring the on-off state of the lamps for individual control of the intermediate simmer current regulators.

14. The method of claim 12 wherein the improvement comprises clamping the transmitting end of the arc lamp to a low voltage level.

15. The method of claim 12 wherein the improvement comprises insulating the high voltage end of the arc lamps.

16. The method of claim 12 wherein the improvement comprises igniting the first lamp in the series string in order for voltage to be impressed across the second arc lamp in the series string, where the first lamp is the lamp closest to the lamp power supply in the circuit, and requiring the second arc lamp to be ignited prior to voltage being impressed across the third lamp in the series string, and so on to the nth and last lamp in the series.

17. The method of claim 12 wherein the improvement comprises clamping the cathode or energy emitting end of the lamp to a low voltage level by a voltage clamping device during high voltage ignition and trapping the high voltage end within an appropriate dielectric.

18. The method of claim 12 wherein the improvement comprises igniting a series configuration of multiple arc lamps with a single high voltage ignition circuit.

19. The method of claim 12 wherein the improvement comprises:

applying a signal to set the set side of a bistable device to initiate the ignition process;

igniting said arc lamps when high energy illumination of the arc lamps is required by sending a current command to the high current modulator;

removing the current command from the high current modulator and returning the arc lamps to a low current simmer mode until reignited or extinguished by employing a topology independent of the time constant control of the ignition circuitry for the ignition of series connected lamps and measuring the on-off state of the lamps for individual control of the intermediate simmer current regulators.

20. The method of claim 19 wherein the improvement comprises clamping the transmitting end of the arc lamp to a low voltage level and insulating the high voltage end of the arc lamps and successively igniting the individual arc lamps wherein the first arc lamp in the series string must be ignited first in order for voltage to be impressed across the second arc lamp in the series string, where the first lamp is the lamp closest to the lamp power supply in the circuit and the second arc lamp must be ignited prior to voltage being impressed across the third lamp in the string, and so on to the nth and last lamp in the series.

* * * * *